Aug. 20, 1940.    W. S. WATTS ET AL    2,212,381
APPARATUS FOR INSERTING STICKS INTO FROZEN CONFECTIONS
Filed March 14, 1938    2 Sheets-Sheet 1
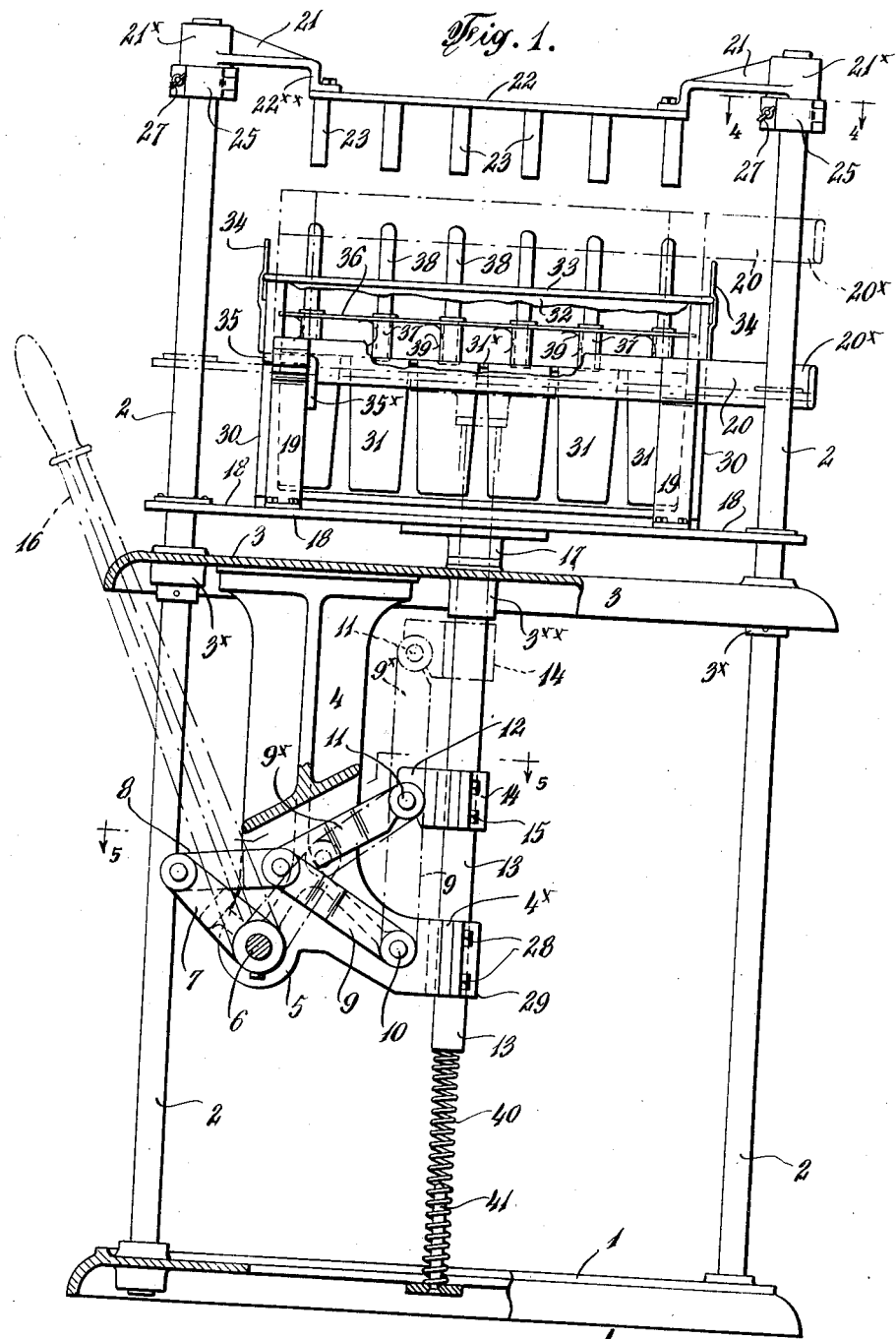

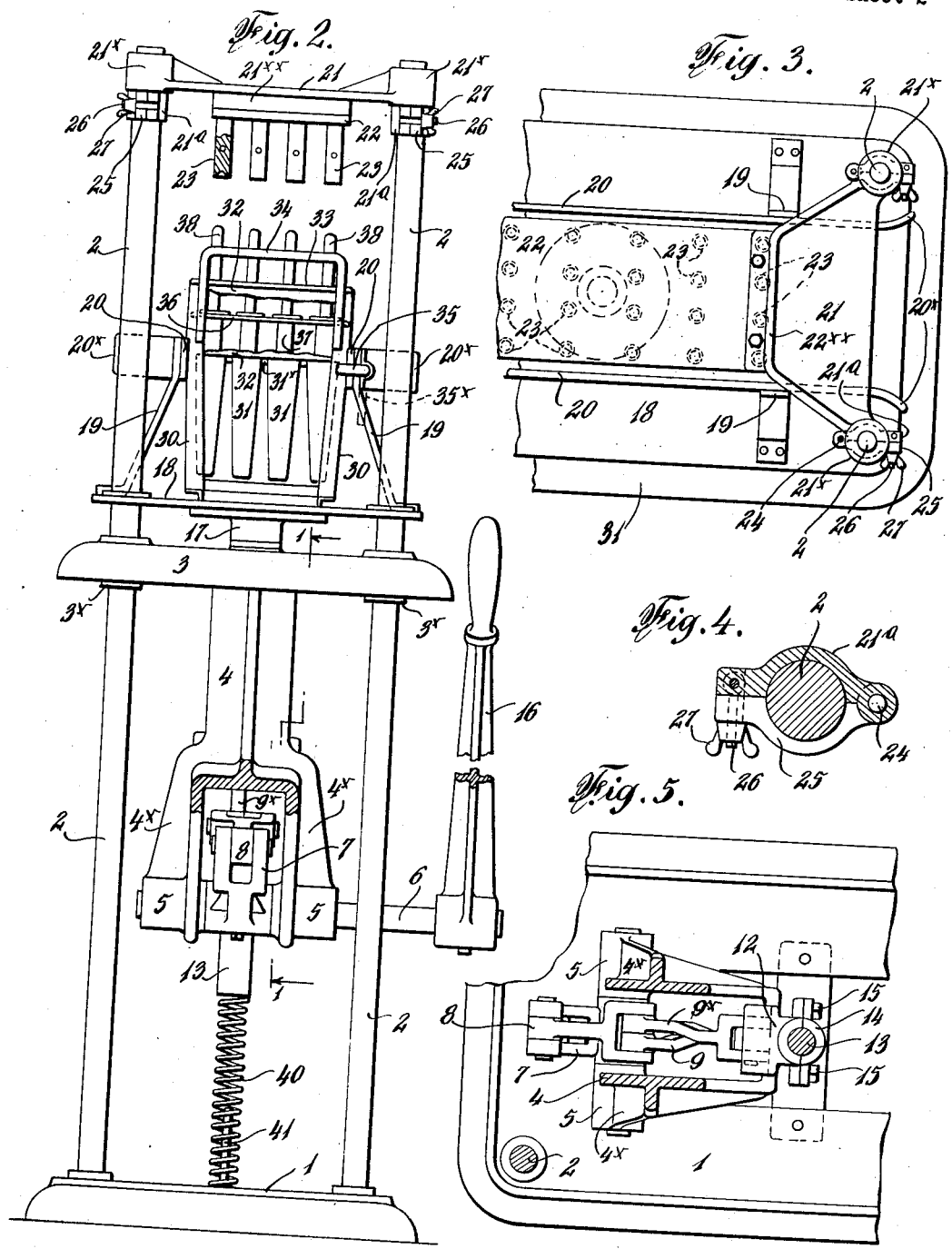

Patented Aug. 20, 1940

2,212,381

UNITED STATES PATENT OFFICE 2,212,381

APPARATUS FOR INSERTING STICKS INTO FROZEN CONFECTIONS

Warren S. Watts, Montclair, N. J., and Edwin L. Elwell, Baltimore, Md., assignors to Eskimo Pie Corporation, Bloomfield, N. J., a corporation of Delaware Application March 14, 1938, Serial No. 195,752

2 Claims. (Cl. 107—8)

The object of the present invention is to provide a new and speedy apparatus for inserting stick handles into frozen confections. The method of operating the apparatus comprises the steps of arranging sticks away from the plural-cavity mold which contains the frozen confections in a manner by which the sticks are given locational arrangement corresponding with the mold cavities, the placing of the group of so arranged sticks over the mold while the latter is held in the stick pressing apparatus, or prior thereto, and operating apparatus to drive the sticks simultaneously, and each into a frozen confection in one of the mold cavities.

The invention will be described with reference to the accompanying drawings, in which:

Figure 1 is a side elevation illustrating an apparatus for inserting sticks into frozen confections by pressure together with a plural cavity mold in position thereon and a stick holder separable from the other elements and supporting sticks in registry with the mold cavity, the figure being partly broken away on the line 1—1, Figure 2.

Figure 2 is a rear elevation of the structure shown in Figure 1.

Figure 3 is an enlarged plan view of the pressing machine shown in the preceding figures, broken away to show the center and one end thereof.

Figure 4 is a horizontal section on the line 4—4, Figure 1.

Figure 5 is a transverse section on the line 5—5, Figure 1.

Referring to the drawings, the machine for inserting sticks into frozen confections consists of a base member 1 which supports a plurality of shaft-like risers 2 which are four in number, in the present embodiment. At an intermediate point of the risers the latter pass through apertured bosses 3x of a heavy horizontal frame plate 3 which carries a depending bracket 4, the latter being forked at its lower end, and each forked member 4x carrying a bearing boss 5.

Rotatably held by the bearing bosses 5 is a horizontal shaft 6 and fixed to the latter intermediate the bosses 5 is a forked lever arm 7. Pivoted between the forks of lever arm 7 is a link 8 which in turn is pivoted to a toggle lever comprising the lever arms 9, 9x. Toggle arm 9 is pivoted at 10 to bracket 4 and toggle arm 9x is pivoted at 11 to a saddle member 12 fixed to vertical shaft 13 by means of a strap 14 secured to saddle 12 by bolts 15.

The shaft is operated by means of any suitable instrumentality as, for example, a hand lever 16.

Shaft 13 rises upwardly through a bearing boss 3xx depending from frame plate 3 and at its upper end carries a flanged collar 17 secured to the lower face of a table 18. Table 18 is formed with laterally reinforced apertures which receive risers 2, the latter guiding the table in its movement later to be described. Carried by the table at its upper face are two sets of opposed bracket arms 19, each set carrying a longitudinal extending guide bar 20 between which the plural-cavity guide bar 20 between which the plural-cavity molds are adapted to be guided into position. At one or both ends the bars 20 may be outwardly flared as shown at 20x, Figure 3.

At their top ends risers 2 receive the apertured bosses 21x of each of two bracket members 21 having their ends bent vertically at 21xx and thence horizontally, the bracket arms receiving between them a block-carrying plate 22, the latter carrying rows of downwardly projected blocks 23, which blocks are positioned in accordance with the rows of cavities in a multi-cavity mold of usual construction, or of desired construction as, for example, one in which there are six rows of cavities with four cavities in each row. Each bearing boss 21x is formed with a depending section best shown in cross-section at 21a, Figure 4, which is pivoted at 24 to a strap 25, the latter having a vertical slot adapted to receive a pivoted locking stud 26 threaded at its outer end to receive a thumb nut 27.

By reason of the construction just described, loosening of the thumb nuts will enable the bracket members 21 with the block plate and blocks carried thereby to be raised or lowered in order to accommodate different heights of frozen confections or to change the degree to which the sticks are to be pressed into the frozen confections.

In the above description it has been shown that the members 12 and 14 are clamped in fixed position upon the rod 13. Below the said members the bracket 4 may be provided with a vertical bearing aperture for the rod or with a semi-annular guide face at 4x formed with threaded apertures by means of which a strap 29 may be secured in position. The faces of the latter two members will be so formed as to guide shaft 13 whilst permitting its free movement, in vertical direction.

In Figures 1 and 2 a plural-cavity mold, somewhat schematically shown, is in operative position on table 18. The mold is shown as constructed with heavy vertical corner members 30 between which are held the rows of cavity members 31, at the top of which will be positioned a horizontal plate formed with apertures, one for each cavity member, the plate being indicated at 31x. Rising upwardly from the edges of plate 31x is the customary skirt 32 which terminates at its top with a reinforcing bead 33. At each end of the mold structure is a handle 34 by means of which the mold is manipulated.

In inserting the mold, it may be moved onto and along table 18 from the end of the pressing apparatus which is shown in plan view, Figure 3. To determine the limit of such positioning movement of the mold, there may be carried by guide bars 20 or one of the arms 19 a swinging stop member having an operative end 35, Figure 2, and a weighted lower operating end 35x which will hold the stop in operative position and which in turn may be moved to swing the stop aside to enable insertion of the mold from the rear face of the apparatus, i. e., the face shown in Figure 2.

In Figures 1 and 2 of the drawings, the mold is shown as having received a stick-centering and holding device comprising a horizontal plate 36 which carries a plurality of depending blocks 37, arranged in rows in accordance with the rows of mold cavities. Each block will be formed with an aperture to receive a stick 38, and there will preferably be provided frictional means or spring acting means to hold the sticks in position prior to their positive movement by the stick-pressing operation. A simple type of spring-holding device for each stick is shown in Figure 1, wherein the wall of each block is formed with an aperture cut through to the stick-receiving aperture, the first aperture receiving a spring 39 carried at its upper end by block-holding plate 36.

In practicing our method, the stick-centering and holding device may be placed upon a table with the blocks 37 lowermost and resting thereon. The sticks may then be quickly inserted through the apertures of the blocks which are designed to receive the sticks, and by their contact with the table the sticks will be inserted the same distance throughout. This stick-positioning operation may be performed whilst the pressing machine is in action with respect to an associated plural-cavity mold and stick-centering and holding element, and when a succeeding mold is placed in position on table 18 the thus prepared stick-centering and holding device is placed thereon with the blocks resting upon the frozen confections in the mold cavities. Thereupon hand lever 16 will move downwardly to straighten the toggle and table 18 is moved upwardly until the top of each stick engages the lower end of its appropriate fixed block 23, the latter being preferably formed with a recess to receive the end of the stick, and the sticks will simultaneously be forced into the frozen confections a distance determined by the adjusted position of the brackets 21 on the risers 2.

To cushion the inactive or return movement of the table and the elements carried thereby, we preferably employ a cushioning device such as the spring 40 received upon a supporting rod 41 carried by base member 1, the upper end of the spring engaging the lower end of shaft 13.

It will be understood that various modifications may be made in the form and arrangement of the elements illustrated in the drawings without departing from the spirit of the invention.

Having described our invention, what we claim and desire to secure by Letters Patent, is as follows:

1. An apparatus for inserting sticks into frozen confections, which comprises a table adapted to receive a plural-cavity mold filled with confections and containing a stick holder charged with sticks, a movable carrier for said table, comprising a vertical shaft, power means for reciprocating said movable carrier and comprising a toggle connected to said shaft and to a fixed member, said fixed member comprising a bracket arm depending from the table and provided with a guiding sleeve for the vertical shaft, a hand lever, and a link connecting the lever and said toggle, guiding means adapted to guide the table in its reciprocatory movements, an adjustable abutment plate carried by said guiding means, and stick-engaging members carried by said adjustable abutment plate.

2. An apparatus for inserting sticks into frozen confections, which comprises a table adapted to receive a plural-cavity mold filled with confections and containing a stick holder charged with sticks, bearing apertures being formed in the table, a plurality of vertical guide members entering said bearing apertures, a horizontal frame member fixed to said guide members below the table, an adjustable abutment plate carried at the top of the guide member and capable of adjustment longitudinally thereof, stick-engaging members carried by said adjustable abutment plate, a bracket depending from the horizontal frame member, a movable carrier for the table reciprocating through said horizontal frame member and through a guiding element carried by said bracket, a toggle connected to the bracket and movable carrier, and a hand lever operatively connected to the toggle for operating the same.

WARREN S. WATTS.
EDWIN L. ELWELL.